US012581333B2

(12) United States Patent
Huang et al.

(10) Patent No.: US 12,581,333 B2
(45) Date of Patent: Mar. 17, 2026

(54) SYSTEMS AND METHODS FOR GRANULAR NETWORK CONFIGURATION VIA NETWORK EXPOSURE FUNCTION

(71) Applicant: Verizon Patent and Licensing Inc., Basking Ridge, NJ (US)

(72) Inventors: Ye Huang, San Ramon, CA (US); Miguel A. Carames, Long Valley, NJ (US); Ratul K. Guha, Warwick, PA (US); Jin Yang, Orinda, CA (US); Suzann Hua, Beverly Hills, CA (US); Alexander Fadeev, Summit, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 518 days.

(21) Appl. No.: 18/168,686

(22) Filed: Feb. 14, 2023

(65) Prior Publication Data

US 2024/0276256 A1     Aug. 15, 2024

(51) Int. Cl.
*H04W 24/08*     (2009.01)
*H04W 4/50*     (2018.01)

(52) U.S. Cl.
CPC ............. *H04W 24/08* (2013.01); *H04W 4/50* (2018.02)

(58) Field of Classification Search
CPC ..... H04W 12/00; H04W 12/08; H04W 40/04; H04W 4/50; H04W 76/10
USPC ........................................................ 370/338
See application file for complete search history.

(56) References Cited

U.S. PATENT DOCUMENTS

| | | | | |
|---|---|---|---|---|
| 9,549,329 | B2 * | 1/2017 | Mancuso ............... | H04W 12/08 |
| 11,036,851 | B2 * | 6/2021 | Davis ...................... | G01R 22/10 |
| 11,748,471 | B2 * | 9/2023 | Davis ................... | G01R 21/133 |
| | | | | 726/1 |
| 2016/0143028 | A1 * | 5/2016 | Mancuso .............. | H04W 12/00 |
| | | | | 370/338 |
| 2020/0050753 | A1 * | 2/2020 | Davis ................... | G06F 1/3246 |
| 2021/0303679 | A1 * | 9/2021 | Davis ................... | G01R 21/133 |
| 2023/0344774 | A1 * | 10/2023 | Abdelmalek ........... | H04L 47/11 |
| 2024/0107595 | A1 * | 3/2024 | Huang .................. | H04W 76/10 |
| 2024/0276256 | A1 * | 8/2024 | Huang ................... | H04W 4/50 |

FOREIGN PATENT DOCUMENTS

| | | | | | |
|---|---|---|---|---|---|
| AU | | 2017341674 A1 * | 5/2019 | ............. | G06F 21/81 |
| ES | | 2908247 T3 * | 4/2022 | ........ | H04W 52/0216 |

* cited by examiner

*Primary Examiner* — William D Cumming

(57) ABSTRACT

A system described herein may receive monitoring information associated with a plurality of User Equipment ("UEs") that receive service via a wireless network. The system may identify, based on the received monitoring information, a particular set of network configuration parameters to implement with respect to service provided to a particular UE, of the plurality of UEs, via the wireless network. The system may provide, to the wireless network, the identified set of network configuration parameters. Providing the identified set of network configuration parameters may include providing an identifier of the particular UE. One or more elements of the wireless network may implement the provided set of network configuration parameters, which may include modifying parameters of the service provided to the particular UE.

21 Claims, 9 Drawing Sheets

500

502
Receive monitoring information associated with UEs that receive service via wireless network 504
Identify configuration parameters to implement with respect to services provided to particular UE 506
Provide configuration parameters, including identifier of UE, to wireless network 508
Wireless network implements configuration parameters to modify service provided to particular UE

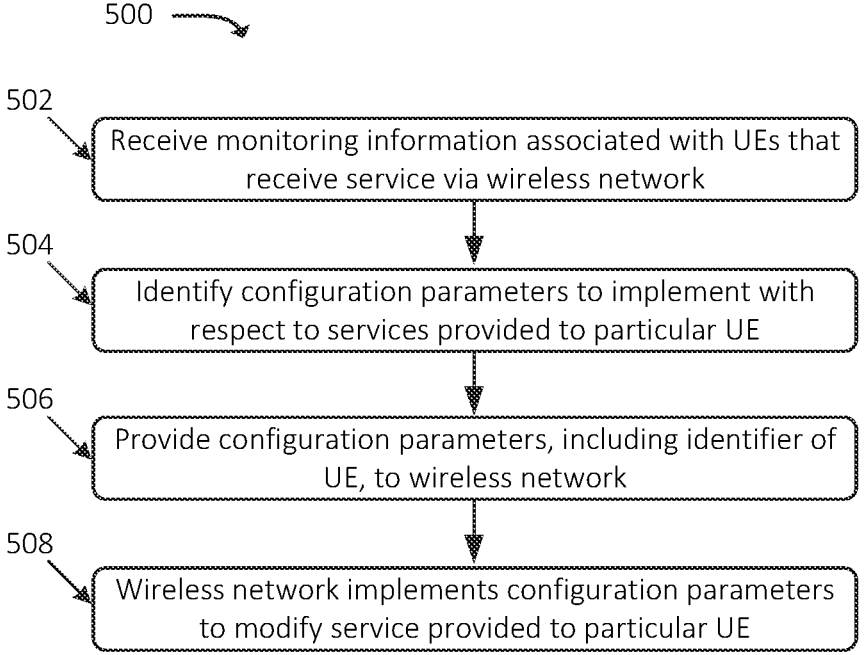

Bus
910

SYSTEMS AND METHODS FOR GRANULAR NETWORK CONFIGURATION VIA NETWORK EXPOSURE FUNCTION

BACKGROUND

Radio access networks ("RANs") may serve as a wireless interface between User Equipment ("UEs"), such as mobile telephones, Internet of Things ("IoT") devices, etc. and a core network and/or other types of networks. RANs and UEs may operate according to different radio access technologies ("RATs"), such as a Long-Term Evolution ("LTE") RAT, a Fifth Generation ("5G") RAT, and/or other RATs. The various RATs may be associated with different frequency bands or sub-bands, such as a Sub-3 Gigahertz or "Sub-3" band, a C-Band (e.g., sometimes referred to as a "Sub-6" band), a millimeter-wave ("mmWave") band, an Advanced Wireless Services ("AWS") band, and/or other bands. Different frequency bands may deliver different speeds, provide for different connectivity range, and/or may have other differentiating attributes. Additionally, elements of the core network, such as User Plane Functions ("UPFs"), routers, etc. may provide varying levels of Quality of Service ("QoS") to different UEs and/or to different types of traffic.

BRIEF DESCRIPTION OF THE DRAWINGS

FIG. 5 illustrates an example process for modifying network configuration parameters based on information received from a source external to the network, in accordance with some embodiments;

DETAILED DESCRIPTION OF EXAMPLE EMBODIMENTS

The following detailed description refers to the accompanying drawings. The same reference numbers in different drawings may identify the same or similar elements.

Figure 1:
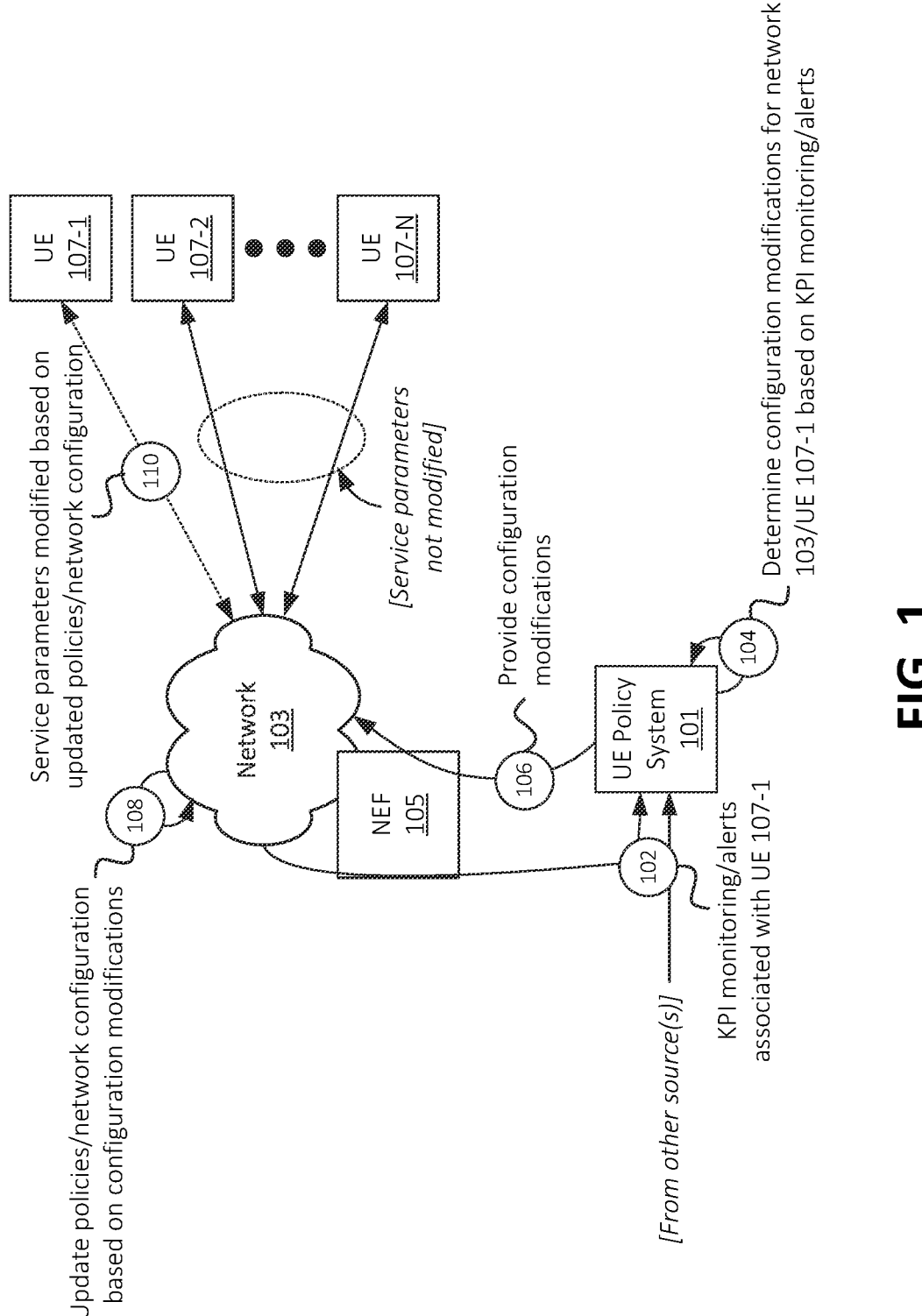
FIG. 1 illustrates an example overview of one or more embodiments described herein.

Embodiments described herein provide for the control and/or configuration of a wireless network (e.g., a core of a wireless network and/or a RAN of the wireless network) via one or more devices or systems that are external to the wireless network. For example, as shown in FIG. 1, UE Policy System ("UEPS") 101 may communicate with network 103 (e.g., a wireless network such as a 5G network, an LTE network, etc.) via an exposure element or other type of suitable interface associated with network 103 (e.g., Network Exposure Function ("NEF") 105, a Service Capability Exposure Function ("SCEF"), or other suitable interface or exposure element) in order to provide service parameters based on which network 103 may provide network services to one or more UEs 107 (e.g., UEs 107-1 through 107-N). As discussed below, UEPS 101 may receive analytics information, monitoring information, alerts, Key Performance Indicators ("KPIs"), or the like from several diverse sources, including sources that aggregate, collect, process, etc. such information, which may include elements internal to network 103 and/or devices or systems that are external to network 103. The information may be granular, such as at the UE level, at the RAT or frequency band level, and/or other levels of granularity or categorization. UEPS 101 may, based on the information collected from these various sources, request or otherwise cause network 103 to implement configuration modifications, policy modifications, and/or other suitable modifications in order to provide an optimal user experience to UEs 107, manage or optimize network resources of network 103, and/or otherwise improve the operation of network 103.

As shown in FIG. 1, for example, UEPS 101 may receive (at 102) KPI monitoring information, alerts, metrics, analytics, and/or other types of information from network 103 (e.g., via NEF 105) and/or from other sources. UEPS 101 may have previously registered with NEF 105, such as by exchanging authentication information (e.g., one or more keys, authentication tokens, etc., whereby NEF 105 may authenticate UEPS 101 and/or vice versa), exchanging authorization information (e.g., whereby NEF 105 may maintain information regarding types of communications that UEPS 101 is authorized to send or receive, elements of network 103 that UEPS 101 is authorized to configure or monitor, or types of instructions or requests that UEPS 101 is authorized to make), exchanging communication or routing information (e.g., an Internet Protocol ("IP") address or other suitable locator information associated with UEPS 101 and/or NEF 105), or other suitable information based on which UEPS 101 may communicate with NEF 105 as discussed herein.

In some embodiments, UEPS 101 registering with NEF 105 may include subscribing to particular types of information, and/or information from particular elements of network 103. For example, UEPS 101 may subscribe to alerts, monitoring information, or the like from particular network functions of a core of network 103 or elements of a RAN of network 103, such as location monitoring or alerts associated with one or more particular UEs 107, usage monitoring or alerts associated with one or more particular UEs 107, monitoring information or alerts from a Charging Function ("CHF") of network 103, monitoring information or alerts from an Access and Mobility Management Function ("AMF") of network 103, monitoring information or alerts from one or more base stations of the RAN of network 103, and/or other suitable information from one or more other elements of network 103.

UEPS 101 may receive (at 102) the KPI information and/or other suitable information from one or more devices or systems that are external to network 103 (e.g., devices or systems that are not associated with a same address space or routing topology as network 103, that are reachable by network 103 via one or more other networks such as the Internet, and/or are otherwise "external" to network 103). The other sources may include, for example, application servers or other devices or systems that collect, aggregate, process, and/or otherwise provide information as discussed herein. For example, the application servers may communicate with elements of network 103 (e.g., via NEF 105), may communicate with one or more UEs 107 (e.g., via one or more application programming interfaces ("APIs") or applications executing at UEs 107), may communicate with other application servers (e.g., to aggregate or "stitch" diverse sets of information), and/or may otherwise receive or maintain information to provide to UEPS 101.

The information received by UEPS 101 (e.g., from network 103 via NEF 105 and/or from one or more other sources) may include granular information associated with particular UEs 107. For example, on a per-UE basis, UEPS 101 may receive (at 102) information indicating usage via particular RATs or bands associated with a given UE 107. The usage information may include, for example, an amount of traffic, via a particular RAT or frequency band, that has been sent or received by a given UE 107 (e.g., via a RAN associated with network 103) over a particular timeframe (e.g., 1.0 Gigabytes of uplink traffic received from UE 107-1 via a Sub-6 band over a 24-hour timeframe). In some embodiments, the usage information may include an amount of traffic that has been sent or received by a given UE 107 via a particular set of QoS parameters (e.g., a particular network slice, a particular 5G QoS Identifier ("5QI") value, a particular QoS Class Identifier ("QCI") value, a particular set of UE Route Selection Policy ("URSP") rules, etc.). In some embodiments, the UE usage information may include traffic or application/service types or categories, such as voice call traffic, file download traffic, content streaming traffic, etc.

In some embodiments, the information received (at 102) by UEPS 101 may include UE location information, such as a geographical location (e.g., specified as latitude and longitude coordinates, Global Positioning System ("GPS") coordinates, etc.) of a given UE 107 at a given time. In some embodiments, the UE location information may include cell or sector information (e.g., a cell identifier, a sector identifier, a tracking area ("TA"), etc.) of a RAN associated with network 103 to which UE 107 is connected or is otherwise in communication range of UE 107.

In some embodiments, the information received (at 102) by UEPS 101 may include network load information, such as an amount of network resources (e.g., associated with core network elements such as UPFs, routers, etc. and/or associated with RAN elements such as base stations, physical interfaces such as fronthaul or backhaul links, etc.) that have been used or are available at various elements of network 103. Such information may include, for example, utilization and/or capacity of processing resources of devices or systems that implement network functions of a core network of network 103, utilization and/or capacity of processing resources of devices or systems that implement elements of a RAN of network 103, utilization and/or capacity of one or more queues of elements of the core network and/or the RAN, etc. In some embodiments, the network load information may be granular and/or otherwise keyed to classifications, categories, attributes, etc. such as network slice, RAT, QoS level, location, and/or other suitable factors.

In some embodiments, the information received (at 102) by UEPS 101 may be historical and/or monitored information, such as information that has been monitored or collected based on usage, events, etc. that have occurred in the past, and/or information that is being monitored in real time or near-real time. Additionally, or alternatively, the information received (at 102) by UEPS 101 may include predicted or estimated information (e.g., predicted UE usage information, predicted UE location information, predicted network demand information, etc.), which has been predicted, estimated, and/or otherwise determined utilizing artificial intelligence/machine learning ("AI/ML") techniques or other suitable modeling or predictive techniques.

In some embodiments, UEPS 101 may receive (at 102) alerts, reports, etc. generated or determined by one or more elements of network 103 and/or other external devices or systems. For example, an application server, a network function, etc. may monitor metrics, KPIs, etc. associated with UEs 107 and may identify particular events, conditions, or the like. For example, a UE location monitoring system may receive or monitor location information of one or more UEs 107, and may identify when the location of a given UE 107 satisfies one or more conditions (e.g., UE 107 has moved into a particular geographical region, UE 107 is moving at a particular speed or velocity, etc.). In such an example, the UE location monitoring system may provide (at 102) an alert regarding the identified conditions associated with the location of UE 107. Additionally, or alternatively, UEPS 101 may receive (at 102) monitoring information (e.g., real time or near-real time monitoring information on a periodic or otherwise ongoing basis), and UEPS 101 may identify one or more triggering events, conditions, or the like.

Based on the received (at 102) information, UEPS 101 may determine (at 104) one or more policies and/or policy modifications, which may include modifying one or more communication sessions (e.g., protocol data unit ("PDU") sessions, radio bearers, etc.) between network 103 and one or more particular UEs 107 (e.g., UE 107-1, in this example). For example, UEPS 101 may determine that UE 107-1 should receive service via one or more particular QoS levels, that UE 107-1 should not receive service via one or more particular QoS levels, that UE 107-1 should receive wireless service via a particular RAT or band, that UE 107-1 should not receive wireless service via a particular RAT or band, and/or may determine other configuration parameters or configuration parameter modifications associated with UE 107-1. In some embodiments, the modifications may include modifications or parameters for particular elements of network 103, such as particular network functions of a core network of network 103, and/or particular base stations or other elements of a RAN of network 103.

In some embodiments, UEPS 101 may maintain one or more models (e.g., AI/ML models or other suitable types of models), lookup tables, and/or other suitable information based on which UEPS 101 may determine particular actions (e.g., network configuration modifications) based on particular triggers (e.g., as identified from the received (at 102) information). More detailed examples are provided with respect to types of configuration modifications that may be determined based on respective triggers identified based on the received information.

UEPS 101 may provide (at 106) the configuration modifications to network 103. For example, UEPS 101 may provide the modifications, via NEF 105, to one or more particular network functions of a core network of network 103, to one or more base stations of a RAN of network 103, and/or other elements of network 103. For example, UEPS 101 may include a network function name or type, such as an indication that a particular set of parameters or modifications are for a UPF, a Policy Control Function ("PCF"), etc. of network 103. Additionally, or alternatively, UEPS 101 may include an identifier of a particular network function instance (e.g., an IP address, an instance identifier, etc.), which may be used in embodiments where network 103 included multiple different instances of the same elements. For example, UEPS 101 may identify a particular instance of a particular network function that is associated with UE 107-1 (e.g., a particular UPF of network 103 that is associated with a communication session with UE 107-1), and may provide updated QoS parameters or other suitable parameters for the particular UPF.

In some embodiments, UEPS 101 may provide (at 106) an identifier (e.g., an International Mobile Subscriber Identity ("IMSI"), an International Mobile Station Equipment Identity ("IVEI"), a Mobile Directory Number ("MDN"), a Subscription Permanent Identifier ("SUPI"), a Globally Unique Temporary Identifier ("GUTI"), an IP address, etc.) of one or more UEs 107 for which network configuration parameters modifications, triggers, alerts, etc. are being provided to NEF 105. In some embodiments, one or more elements of network 103 may subscribe to information or updates received by NEF 105, for UEs 107 that are being served by such elements. Assume, for instance, that UE 107-1 is engaged in a communication session with a particular UPF of network 103. Based on communicating with UE 107-1 via the particular communication session, the particular UPF may subscribe to updates or information received by NEF 105 that include an identifier of UE 107-1. When UEPS 101 provides a set of network configuration parameter modifications, triggers, alerts, etc. for UE 107-1, the UPF may receive some or all of the network configuration parameter modifications, triggers, alerts, etc. for UE 107-1 based on subscribing to information associated with UE 107-1. As another example, one or more elements of a RAN of network 103 may subscribe to updates, information, etc. for one or more UEs 107 received by NEF 105 when such UEs 107 connect to the RAN of network 103. In this manner, UEPS 101 may be able to provide (at 106) configuration modifications, alerts, triggers, and/or other suitable information based on which network 103 may modify parameters of services provided to particular UEs 107.

Network 103 may update (at 108) a set of policies and/or other network configuration parameters based on the received (at 106) configuration modifications. For example, a provisioning system, an orchestration system, a RAN controller, and/or other suitable device or system may configure one or more elements of network 103 based on the indicated modifications, and/or may otherwise provide the modifications to respective elements of network 103 to which the modifications are directed. Once network 103 updates (at 108) the policies and/or network configuration parameters, network 103 may provide (at 110) service to UE 107-1 in accordance with the updated policies and/or configuration parameters. The updated service parameters may include, for example, a modified set of QoS parameters (e.g., network slices, 5QI values, etc.) of communication sessions (e.g., user plane traffic sessions such as PDU sessions) between ULE 107-1 and a core network of network 103, a modified set of RF resource allocations or other QoS parameters associated with communications between UE 107-1 and a RAN of network 103, and/or other suitable service parameters.

In some embodiments, the configuration modifications (provided at 106) may include modifications to an infrastructure or provisioning of elements of network 103. For example, the configuration modifications may include instructions to provision additional computing resources or other types of resources for particular elements of network 103. For example, network 103 may include, may implement, and/or may be implemented by a self-organizing network ("SON"), a cloud-based architecture, a containerized environment, or the like, in which virtual machines, containers, etc. may implement various elements of network 103. Provisioning additional resources for a particular element of network 103 may increase the capacity (e.g., processing capacity, network capacity, load-handling capacity, etc.) of the particular element, while de-provisioning resources for a particular element of network 103 (e.g., in situations where such element is overprovisioned, underutilized, etc.) may free up resources for use elsewhere and/or to reduce energy consumption.

In the example of FIG. 1, service parameters associated with UE 107-1 are modified (at 110), while service parameters associated with other UEs (e.g., UEs 107-2 and 107-N) are not modified. In this situation, UEPS 101 may have determined (at 104) configuration modifications based on triggers identified with respect to UE 107-1 in the KPI monitoring information (received at 102), while UEPS 101 may not have determined such modifications for the other UEs 107. In this sense, the modifications implemented (at 108) may be specific to UE 107-1, thus providing a granular (e.g., UE-specific) level of control for the configuration of network 103 via NEF 105.

Figure 2:
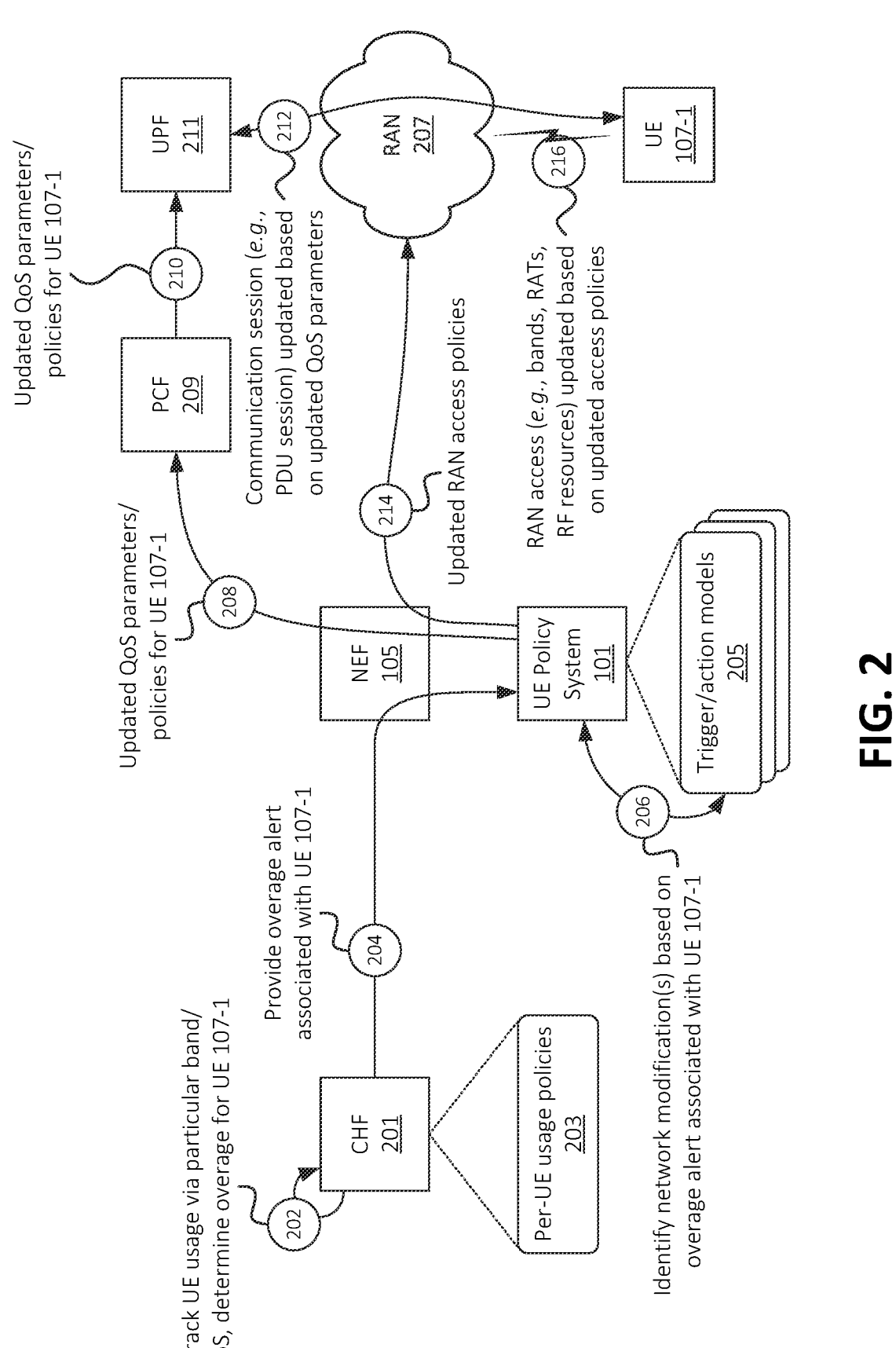
FIGS. 2-4 illustrate different network configuration modifications that may be performed based on alerts or other types of monitored network information, in accordance with some embodiments.
Figure 3:
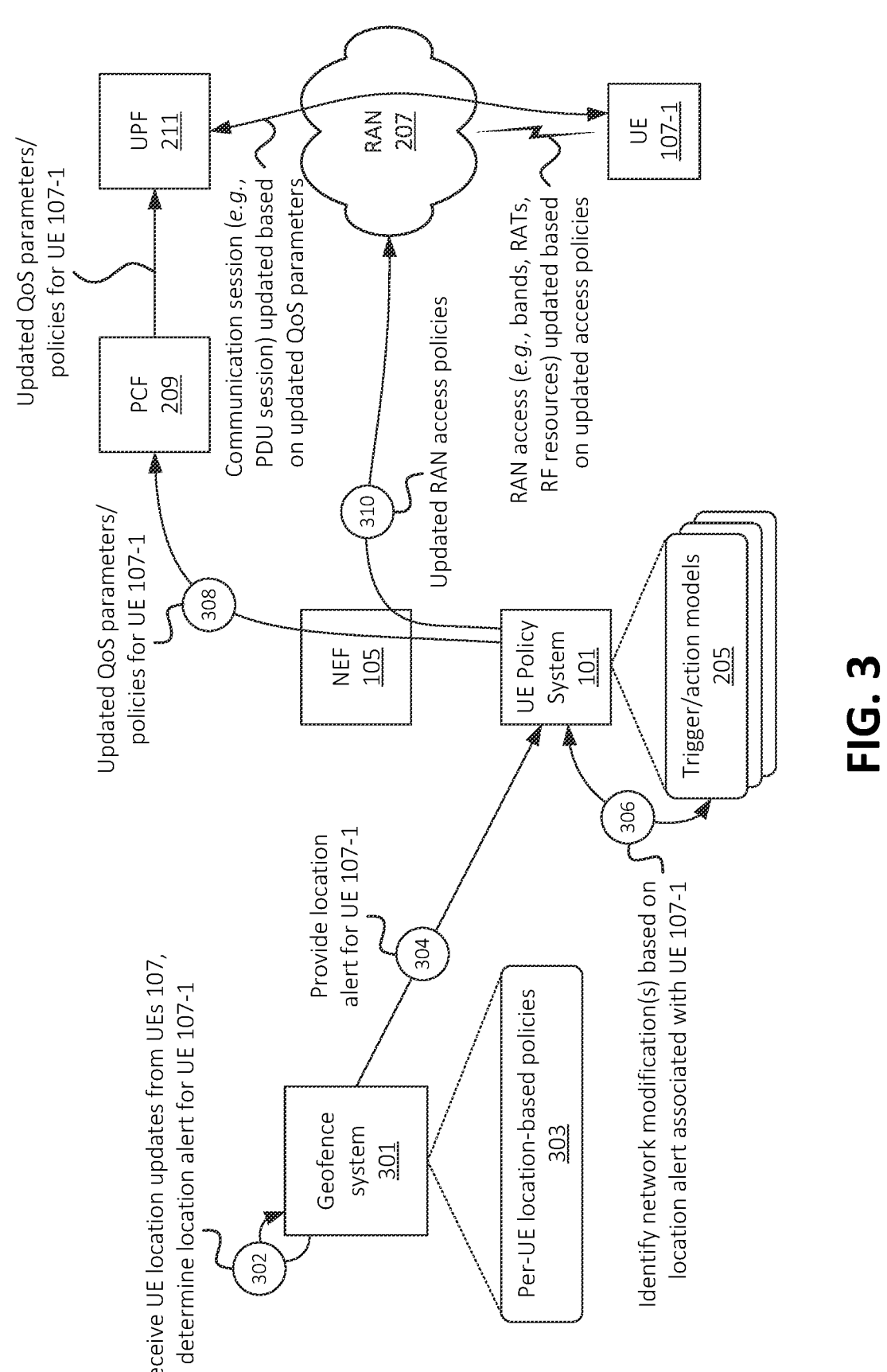
Figure 4:
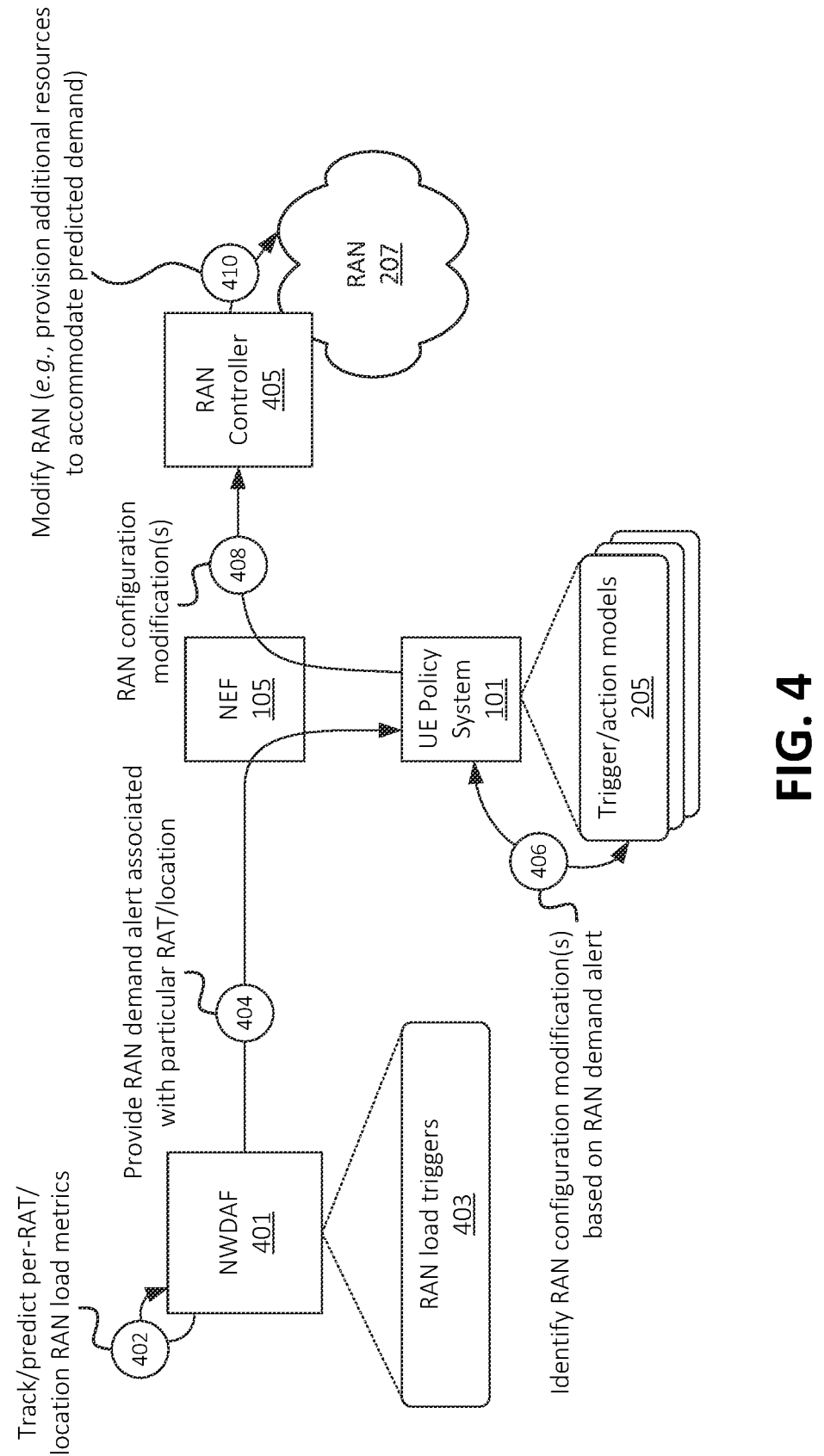

FIGS. 2-4 illustrate examples of types of information that may be received (e.g., at 102) by UEPS 101 as well as types of network configuration modifications that may be made based on the received information. As shown in FIG. 2, Charging Function ("CHF") 201 may track (at 202) UE usage information, which may include information regarding particular QoS parameters, frequency bands, RATs, traffic and/or application/service types, etc. used by particular UEs 107. The UE usage information may include, for example, an amount of traffic sent and/or received by one or more UEs 107 as well as attributes of the traffic. Such attributes may include QoS parameters, such as network slice (e.g., a network slice associated with a PDU session via which the traffic is sent or received), Service Level Agreements ("SLAs") or other QoS policies associated with the traffic (e.g., maximum latency, minimum throughput, etc.), application or service type (e.g., voice call, file transfer, etc.), or other suitable QoS parameters. CHF 201 may receive some or all of the usage information from a Session Management Function ("SMF"), a Serving Gateway ("SGW"), or other suitable element of a core of network 103.

In some embodiments, the UE usage information may include an amount of traffic sent or received by UEs 107 via particular RATs and/or frequency bands (e.g., RAN-level usage information). While discussed in the context of CHF 201, in practice, one or more other types of devices or systems (e.g., an Offline Charging System ("OCS")) may collect, aggregate, process, provide, etc. UE usage information. For example, in some embodiments, an application server or other device or system (e.g., a device or system external to network 103) may receive UE usage information (e.g., usage information indicating particular bands, RATs, etc. utilized by UE 107 to send or receive traffic) from UE 107 and/or from some other source. In some embodiments, such external device or system may receive UE usage information via NEF 105 and/or one or more other elements of network 103, such as an Access and Mobility Management Function ("AMF"), a Mobility Management Entity ("MME"), a Unified Data Management function ("UDM"), a Home Subscriber Server ("HSS"), and/or some other suitable element of network 103. In some embodiments, for example, UE 107 may provide the usage information (e.g., band-specific usage information, RAT-specific usage information, etc.) to an AMF via Non-Access Stratum ("NAS") signaling, which may provide the information to the application server or other device or system via NEF 105.

In some embodiments, the application server or other device or system (and/or UEPS 101) may receive usage information, associated with one or more UEs 107, from UEs 107 via one or more APIs, applications executing at UEs 107, and/or via some other suitable communication pathway. For example, a particular UE 107 may track its own usage information (e.g., amounts of traffic sent and/or received by the particular UE 107, as well as attributes of such traffic), and may report some or all of such information to UEPS 101 and/or other suitable device or system that forwards such information to UEPS 101.

CHF 201 (and/or UEPS 101 or other suitable device or system) may further maintain a set of per-UE usage policies 203. Per-UE usage policies 203 may include policies such as limits on amounts of traffic associated with a particular band, RAT, set of QoS parameters, etc. for each UE 107. Different UEs 107, groups of UEs 107, types of UEs 107 (e.g., mobile telephones, Internet of Things ("IoT") devices, etc.), categories of UEs (e.g., "enterprise," "first responder," etc.), or the like may be associated with different policies, limits, etc. In some embodiments, per-UE usage policies 203 may be provided by, and/or may be derived from information maintained or provided by, a UDM, an HSS, and/or other some other source. As discussed above, UEPS 101 may, in some embodiments, receive or maintain some or all of the per-UE usage policies 203 in addition to, or in lieu of, CIF 201.

As shown, CHF 201 and/or some other device or system (e.g., an external application server, a UE usage tracking system, etc.) may determine (at 202) an overage for a particular UE 107-1. For example, based on tracked UE usage information for UE 107-1, CIF 201 may identify that usage associated with UE 107-1 exceeds one or more per-UE usage policies 203. CIF 201 may accordingly provide (at 204) an overage alert to NEF 105, indicating that usage of UE 107-1 has exceeded one or more thresholds indicated by one or more respective per-UE usage policies 203. For example, CIF 201 may provide the overage alert to NEF 105 based on a subscription to such information by UEPS 101, and/or may provide such information NEF 105 independent or irrespective of whether UEPS 101 has subscribed to such information. For example, in some embodiments, CHF 201 may indicate UEPS 101 as a recipient for the overage alert, while in other embodiments, CHF 201 may not indicate UEPS 101 as a recipient for the overage alert. NEF 105 may provide, forward, etc. the overage alert to UEPS 101 based on a subscription by UEPS 101 for such information.

As noted above, UEPS 101 may maintain information associating a set of triggers with a set of actions, such as trigger/action models 205. For example, trigger/action models 205 may include AI/ML models, lookup tables, or other suitable models or data structures that associate particular triggers with different actions. The triggers may include, for example, alerts indicating that particular conditions have been met (e.g., usage thresholds exceeded or other types of conditions, as discussed below) or other suitable information. As discussed above, the alerts, triggers, etc. may be received by UEPS 101 or may be identified by UEPS 101 based on information received from one or more sources. The actions may include network parameters and/or configuration modifications, such as QoS parameters (e.g., network slice, 5QI values, etc.), RAN access policies (e.g., RATs or frequency bands that a given UE 107 is authorized to use), or other suitable actions to perform in response to particular triggers.

In some embodiments, different UEs 107 may be associated with different actions in response to the same trigger or type of trigger. For example, a first action for a first UE 107-1 in response to an overage alert may indicate that access to a particular RAT, for the first UE 107-1 should be restricted (e.g., the first UE 107-1 may no longer be permitted to utilize the particular RAT), while a second action for a second UE 107-2 in response to the same overage alert may indicate that an RF resource allocation for UE 107-2 via the particular RAT should be reduced (but UE 107-2 should still be permitted to utilize the particular RAT).

Based on the received (at 204) overage alert associated with UE 107-1, and further based on trigger/action models 205, UEPS 101 may identify (at 206) a particular action (e.g., one or more network parameters or network configuration modifications to be implemented) in response to the overage alert. In some situations, the modifications may include modifications to be implemented at a core of network 103 and/or a RAN of network 103 (e.g., RAN 207). In this example, assume that the determined modifications include a modification of one or more QoS parameters and/or policies associated with UE 107-1, based on the overage alert. For example, such modifications may indicate that UE 107-1 should not have access to a particular network slice, and/or may indicate a particular set of network slices to which UE 107-1 is authorized to access (e.g., which may be different from, and/or may exclude, one or more network slices to which UE 107-1 previously had access before such modification). UEPS 101 may provide (at 208) such updated QoS parameters to one or more elements of the core of network 103 via NEF 105, such as PCF 209. PCF 209 may provide the updated QoS parameters to one or more elements of network 103 that implement the QoS parameters, such as UPF 211 that is currently engaged in one or more communication sessions (e.g., PDU sessions) with UE 107-1. UPF 211 may update (at 212) the one or more communication sessions with UE 107-1, which may include modifying QoS parameters associated with existing communication sessions, or removing or de-establishing existing communication sessions that do not meet the updated QoS parameters.

As further shown in this example, the determined (at 206) actions may include a modification to RAN access policies, such as RATs and/or frequency bands that UE 107-1 is authorized to access via RAN 207, locations (e.g., cells, sectors, geographical locations, etc.) in which UE 107-1 is authorized to access RAN 207, locations in which UE 107-1 is authorized to access particular RATs and/or frequency bands, RF resource allocations (e.g., amounts of RF resources) of RAN 207 for ULE 107-1, and/or other suitable RAN access policies. UEPS 101 may provide (at 214) the updated RAN access polices to one or more base stations, of RAN 207, to which UE 107-1 is connected. Additionally, or alternatively, UEPS 101 may provide (at 214) the RAN access policies to an AMF or other suitable device or system, which may forward the RAN access policies to RAN 207, and/or may otherwise cause or instruct RAN 207 to implement the RAN access policies with respect to UE 107-1. Accordingly, the wireless service provided to UE 107-1 via RAN 207 may be updated (at 216) in accordance with the updated RAN access policies.

FIG. 3 illustrates another example modification of network parameters based on information and/or alerts received or determined by UEPS 101. As shown, one or more devices or systems external to network 103, such as geofence system 301 may receive (at 302) location updates from one or more UEs 107. For example, geofence system 301 may receive such information from UEs 107 via one or more APIs, applications executing at UEs 107, etc. UEs 107 may, for example, utilize GPS techniques, geofencing techniques, triangulation techniques, or other suitable techniques to determine their own location, and may report such location information to geofence system 301. Additionally, or alternatively, geofence system 301 may receive UE location information from some other source, such as one or more other devices or systems that determine UE location information. The UE location information may include, for example, latitude and longitude coordinates, GPS coordinates, cell or sector identifiers, TAs, or other suitable location information.

Geofence system 301 may also maintain a set of per-UE location based policies 303, which may indicate conditions, triggers, etc. based on which geofence system 301 may identify one or more alerts, events, or the like. Additionally, or alternatively, as similarly discussed above, UEPS 101 may maintain some or all of the per-UE location-based policies 303 in addition to, or in lieu of, geofence system 301. Geofence system 301 may further determine (at 302) a location alert associated with a particular UE 107-1. For example, based on receiving location updates associated with UE 107-1, geofence system 301 may identify that one or more conditions, thresholds, etc. indicated in per-UE location-based policies 303 have been met. Geofence system 301 may accordingly provide (at 304) a location alert to UEPS 101, such as via an API or other suitable communication pathway. Additionally, or alternatively, as similarly discussed above, geofence system 301 may provide some or all of the UE location updates to UEPS 101, and UEPS 101 may identify one or more location alerts.

While the location updates and/or alerts are discussed in the context of geofence system 301 (e.g., a devices or systems external to network 103), in some embodiments UEPS 101 may receive (e.g., via NEF 105) UE location monitoring information and/or alerts from one or more elements of network 103 that determine or track a location of one or more UEs 107, such as an AMF, an MME, or the like. For example, UEPS 101 may have subscribed to such information during a registration procedure with NEF 105 and/or at some other time.

Based on receiving (at 304) or determining the location alert associated with UE 107-1, UEPS 101 may identify (at 306) one or more network parameters or modifications to implement in response to the location alert. For example, trigger/action models 205 may include information associating location alerts and/or other UE location information with one or more actions. As discussed above, the actions may include, for example, modifying QoS parameters, modifying RAN access policies, and/or other suitable actions. As similarly discussed above, UEPS 101 may output (at 308) updated configuration parameters to a core of network 103 (e.g., to PCF 209 and/or other elements of the core of network 103), and/or may output (at 310) updated configuration parameters (e.g., updated RAN access policies) to RAN 207 of network 103. Accordingly, as similarly noted above, UE 107-1 may receive modified service from RAN 207 (e.g., modified access to one or more RATs or frequency bands, modified RF resource allocations, etc.) and/or from the core (e.g., modified QoS parameters via UPF 211) based on the updated configuration parameters.

FIG. 4 illustrates another example modification of network parameters based on information and/or alerts received or determined by UEPS 101. As shown, one or more devices or systems of network 103, such as Network Data Analytics Function ("NWDAF") 401, may track and/or predict (at 402) a measure of demand or load at RAN 207. Demand or load may refer to, for example, an amount of traffic that has been and/or received via RAN 207, and/or that is predicted to be sent and/or received via RAN 207. For example, NWDAF 401 may utilize AI/ML modeling techniques and/ or other predictive techniques (e.g., based on historical measures of demand and/or one or more models) to predict or determine a measure of demand at RAN 207 at a future time. For example, NWDAF 401 may identify temporal patterns (e.g., relatively high demand at certain times of the day or days of the week), location-based patterns (e.g., relatively high demand at particular geographical locations served by RAN 207), and/or other patterns based on which NWDAF 401 may predict demand at RAN 207 (and/or at particular locations served by RAN 207). In some embodiments, NWDAF 401 may utilize other techniques to determine or predict a measure of demand at RAN 207 (e.g., relatively high demand or load, relatively low demand or load, etc.). For example, NWDAF 401 may receive information indicating actual or predicted traffic or service types, such as a relatively large amount of large file uploads at a particular location at a particular time (e.g., daily security video file uploads or backups at a particular office, facility, etc.). In some embodiments, NWDAF 401 may determine or predict a measure of demand or load on a per-RAT basis, a per-frequency band basis, or the like.

NWDAF 401 may also maintain a set of RAN load triggers 403, which may indicate conditions, triggers, etc. based on which NWDAF 401 may identify one or more alerts, events, or the like. Additionally, or alternatively, as similarly discussed above, UEPS 101 may maintain some or all of the RAN load triggers 403 in addition to, or in lieu of, NWDAF 401. NWDAF 401 may further determine (at 402) a demand alert associated with RAN 207 (e.g., a particular location associated with RAN 207, such as a particular cell, sector, geographical location, etc.). For example, NWDAF 401 may identify that actual or predicted measures of demand or load may meet one or more conditions, thresholds, etc. indicated in RAN load triggers 403. NWDAF 401 may accordingly provide (at 404) a demand alert to UEPS 101, such as via NEF 105, an API, or other suitable communication pathway. Additionally, or alternatively, as similarly discussed above, NWDAF 401 may provide some or all of the RAN demand or load metrics to UEPS 101, and UEPS 101 may identify one or more demand alerts.

While the measures of demand and/or load are discussed in the context of NWDAF 401 (e.g., an element of network 103), in some embodiments UEPS 101 may receive demand alerts or other load monitoring information from one or more devices or systems external to network 103 (e.g., via an API or other suitable communication pathway). Further, in some embodiments, UEPS 101 may receive demand alerts or load monitoring information from one or more elements of RAN 207, such as RAN controller 405, a base station, or other device or system of RAN 207.

Based on receiving (at 404) or determining the demand alert associated with RAN 207 and/or a portion thereof, UEPS 101 may identify (at 406) one or more network parameters or modifications to implement in response to the demand alert. For example, trigger/action models 205 may include information associating demand alerts with one or more actions. As discussed above, the actions may include, for example, modifying RAN parameters, such as modifying an amount of resources, hardware, virtual or containerized systems, etc. that implement RAN 207 and/or portions thereof. For example, UEPS 101 may determine that an amount of processing resources or other resources for a particular base station of RAN 207 should be increased when identifying (at 406) that demand associated with the particular base station has increased or is predicted to increase (e.g., beyond a threshold level of demand). As another example, UEPS 101 may determine that an amount of processing resources or other resources for a base station that provides access via a particular RAT or frequency band should be increased when identifying (at 406) that demand associated with the particular RAT or frequency band (e.g., for UEs accessing RAN 207 via the base station) has increased or is predicted to increase. On the other hand, UEPS 101 may also determine that demand associated with a particular base station, RAT, frequency band, etc. is relatively low (e.g., below one or more thresholds) or is decreasing, and may identify (at 406) an action based on such determination indicating that resources associated with the particular base station, RAT, frequency band, etc. should be reduced, thus freeing up such resources for other base stations, RATs, frequency bands, etc.

UEPS 101 may output (at 408) updated configuration parameters RAN controller 405, which may orchestrate, configure, etc. elements of RAN 207. For example, RAN controller 405 may orchestrate, may implement, etc. a containerized environment (e.g., implementing the open source Kubernetes API or some other type of containerized environment), a virtualized environment, a self-organizing network ("SON"), an O-RAN architecture, and/or other type of system with configurable and/or allocatable hardware resources. RAN controller 405 may, for example, allocate processing resources or other resources, instantiate or install containers implementing various functions of RAN 207, and/or otherwise manage or orchestrate the architecture and/or deployment of RAN 207. Accordingly, based on receiving (at 408) the RAN configuration modifications from UEPS 101 (e.g., via NEF 101), RAN controller 405 may modify (at 410) one or more parameters of RAN 207 to accommodate the predicted demand, such as by allocating additional resources to certain elements of RAN 207, de-allocating resources from certain elements of RAN 207 (e.g., when determining relatively low demand and/or for load balancing purposes), and/or other suitable actions.

FIGS. 2-4, discussed above, provide example triggers, alerts, events, etc. based on which particular actions may be identified (e.g., network configuration modifications as determined by UEPS 101 based on trigger/action models 205). In practice, UEPS 101 may receive or determine one or more other types of triggers, alerts, events, etc. based on which a suitable action should be performed. Further, while example actions were discussed above (e.g., example network configuration modifications and/or parameters to implement), in practice, UEPS 101 may identify one or more other types of actions to perform (e.g., instructions, modifications, information, etc. to provide to network 103 via NEF 105) based on received or identified triggers, alerts, events, etc.

FIG. 5 illustrates an example process 500 for modifying network configuration parameters based on information received from a source external to the network. In some embodiments, some or all of process 500 may be performed by UEPS 101. In some embodiments, one or more other devices may perform some or all of process 500 in concert with, and/or in lieu of, UEPS 101 (e.g., one or more elements of network 103, such as core network elements and/or RAN elements).

As shown, process 500 may include receiving (at 502) monitoring information associated with UEs that receive service via a wireless network. For example, UEPS 101 may receive monitoring information (e.g., KPIs, analytics information, usage information, location information, etc.) associated with one or more UEs 107 that communicate with or via network 103. Additionally, or alternatively, UEPS 101 may receive alerts, triggers, etc. based on monitored information associated with one or more such UEs 107. In some embodiments, UEPS 101 may receive the monitoring information, alerts, etc. from network elements via a network exposure element (e.g., NEF 105, a SCEF, etc.). Additionally, or alternatively, UEPS 101 may receive the monitoring information, alerts, etc. from one or more devices or systems that are external to network 103 (e.g., may receive such information via one or more APIs, the Internet or some other network, and/or some other suitable communication pathway). In some embodiments, UEPS 101 may identify one or more alerts, events, triggers, etc. based on receiving monitored information. In some embodiments, the monitored information may include identifiers of respective UEs 107 with which the monitored information is associated, based on which UEPS 101 may identify which respective UE 107 is associated with which received information.

Process 500 may further include identifying (at 504) configuration parameters to implement with respect to services provided to a particular UE. For example, as discussed above, UEPS 101 may receive or otherwise identify one or more triggers, events, alerts, etc. based on which UEPS 101 may determine that network configuration parameters (e.g., parameters relating to core network elements and/or RAN elements) should be modified. For example, as discussed above, UEPS 101 may receive or maintain trigger/action models 205 or other suitable information that may correlate particular monitored metrics, KPIs, location information, alerts, triggers, etc. to respective actions that may include network configuration modifications. In some embodiments, UEPS 101 may receive (e.g., via NEF 105) UE information, such as currently authorized RATs or bands, currently authorized QoS levels, and/or other suitable information. The UE information may be received from one or more elements of network 103 that receive or maintain such information, such as a UDM, an HSS, a PCF, a PCRF, and/or other suitable device or system. As such, the determined network configuration parameter modifications may be determined relative to currently implemented network configuration parameters with respect to UE 107. In some embodiments, the determined network configuration parameter modifications may be determined without regard to currently implemented network configuration parameters with respect to UE 107 (e.g., UEPS 101 may determine a modified authorized set of RATs and/or frequency bands, an authorized set of QoS parameters, etc. without regard to RATs, frequency bands, QoS parameters, etc. that are currently authorized for UE 107).

Process 500 may additionally include providing (at 506) the determined configuration parameters to the wireless network. For example, UEPS 101 may provide the determined configuration parameters to NEF 105, along with an identifier of UE 107. In this manner, elements of network 103 (e.g., network functions of a core of network 103, elements of RAN 207 of network 103, etc.) may identify the provided configuration parameters and may implement (at 508) the parameters in order to modify services provided to UE 107 via network 103. For example, as discussed above, network functions that communicate with UE 107 and/or that are otherwise involved with services provided to UE 107 (e.g., a UDM that maintains UE information associated with UE 107, PCF 209 that maintains policies associated with ULE 107, UPF 211 that communicates with UE 107 via one or more PDU sessions, etc.) may identify and implement the received configuration parameters. Additionally, or alternatively, UEPS 101 may provide (at 506) the configuration parameters with an indication of particular elements of network 103 to which the configuration parameters are directed, based on which the configuration parameters may be provided to the indicated network elements.

Figure 6:
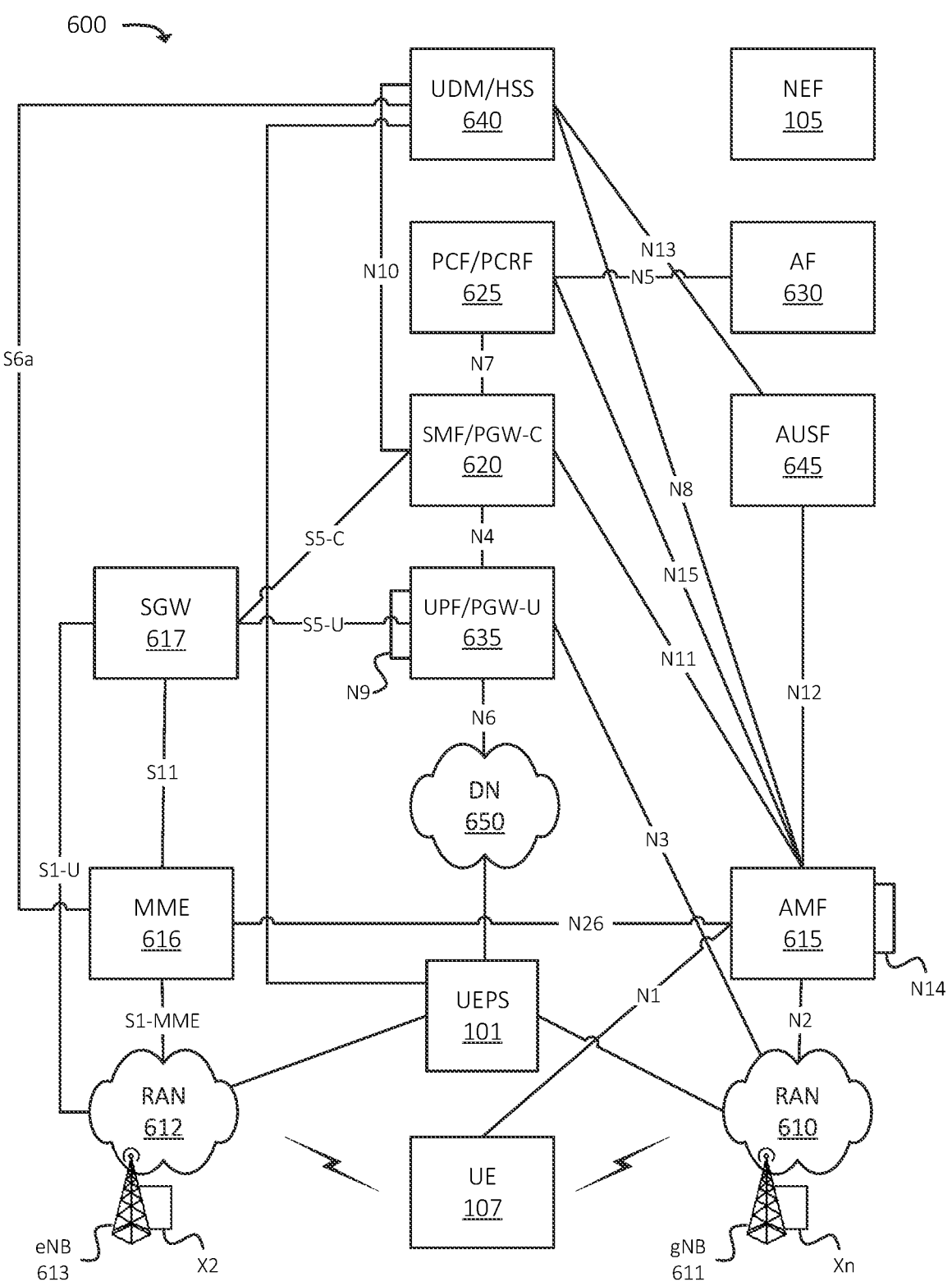
FIG. 6 illustrates an example environment in which one or more embodiments, described herein, may be implemented.

FIG. 6 illustrates an example environment 600, in which one or more embodiments may be implemented. In some embodiments, environment 600 may correspond to a 5G network, and/or may include elements of a 5G network. In some embodiments, environment 600 may correspond to a 5G Non-Standalone ("NSA") architecture, in which a 5G RAT may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). In some embodiments, portions of environment 600 may represent or may include a 5G core ("5GC"). As shown, environment 600 may include UE 107, RAN 610 (which may include one or more Next Generation Node Bs ("gNBs") 611), RAN 612 (which may include one or more evolved Node Bs ("eNBs") 613), and various network functions such as AMF 615, MME 616, SGW 617, SMF/ Packet Data Network ("PDN") Gateway ("PGW")-Control plane function ("PGW-C") 620, PCF/Policy Charging and Rules Function ("PCRF") 625, Application Function ("AF") 630, UPF/PGW-User plane function ("PGW-U") 635, UDM/HSS 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as UEPS 101. Further, as discussed above, environment 600 may include NEF 105, which may communicate with some or all of the elements of environment 600 via one or more SBIs (e.g., an "Nnef" SBI) or other suitable communication pathways.

The example shown in FIG. 6 illustrates one instance of each network component or function (e.g., one instance of SMF/PGW-C 620, PCF/PCRF 625, UPF/PGW-U 635, UDM/HSS 640, and/or AUSF 645). In practice, environment 600 may include multiple instances of such components or functions. For example, in some embodiments, environment 600 may include multiple "slices" of a core network, where each slice includes a discrete and/or logical set of network functions (e.g., one slice may include a first instance of SMF/PGW-C 620, PCF/PCRF 625, UPF/ PGW-U 635, UDM/HSS 640, and/or AUSF 645, while another slice may include a second instance of SMF/PGW-C 620, PCF/PCRF 625, UPF/PGW-U 635, UDM/HSS 640, and/or AUSF 645). The different slices may provide differentiated levels of service, such as service in accordance with different QoS parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Elements of environment 600 may interconnect with each other and/or other devices via wired connections, wireless connections, or a combination of wired and wireless connections. Examples of interfaces or communication pathways between the elements of environment 600, as shown in FIG. 6, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 6, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 600 may be, may include, may be implemented by, and/or may be communicatively coupled to network 103.

UE 107 may include a computation and communication device, such as a wireless mobile communication device that is capable of communicating with RAN 610, RAN 612, and/or DN 650. UE 107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 107 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 107 may communicate with one or more other elements of environment 600. UE 107 may communicate with RAN 610 via an air interface (e.g., as provided by gNB 611). For instance, RAN 610 may receive traffic (e.g., user plane traffic such as voice call traffic, data traffic, messaging traffic, etc.) from UE 107 via the air interface, and may communicate the traffic to UPF/PGW-U 635 and/or one or more other devices or networks. Further, RAN 610 may receive signaling traffic, control plane traffic, etc. from UE 107 via the air interface, and may communicate such signaling traffic, control plane traffic, etc. to AMF 615 and/or one or more other devices or networks. Additionally, RAN 610 may receive traffic intended for UE 107 (e.g., from UPF/PGW-U 635, AMF 615, and/or one or more other devices or networks) and may communicate the traffic to UE 107 via the air interface. In some embodiments, RAN 207 may be, may include, may be implemented by, and/or may be communicatively coupled to RAN 610.

RAN 612 may be, or may include, a LTE RAN that includes one or more base stations (e.g., one or more eNBs 613), via which UE 107 may communicate with one or more other elements of environment 600. UE 107 may communicate with RAN 612 via an air interface (e.g., as provided by eNB 613). For instance, RAN 612 may receive traffic (e.g., user plane traffic such as voice call traffic, data traffic, messaging traffic, signaling traffic, etc.) from UE 107 via the air interface, and may communicate the traffic to UPF/PGW-U 635 (e.g., via SGW 617) and/or one or more other devices or networks. Further, RAN 612 may receive signaling traffic, control plane traffic, etc. from UE 107 via the air interface, and may communicate such signaling traffic, control plane traffic, etc. to MME 616 and/or one or more other devices or networks. Additionally, RAN 612 may receive traffic intended for UE 107 (e.g., from UPF/PGW-U 635, MME 616, SGW 617, and/or one or more other devices or networks) and may communicate the traffic to UE 107 via the air interface. In some embodiments, RAN 207 may be, may include, may be implemented by, and/or may be communicatively coupled to RAN 612.

AMF 615 may include one or more devices, systems, Virtualized Network Functions ("VNFs"), Cloud-Native Network Functions ("CNFs"), etc., that perform operations to register UE 107 with the 5G network, to establish bearer channels associated with a session with UE 107, to hand off UE 107 from the 5G network to another network, to hand off UE 107 from the other network to the 5G network, manage mobility of UE 107 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, CNFs, etc., that perform operations to register UE 107 with the EPC, to establish bearer channels associated with a session with UE 107, to hand off UE 107 from the EPC to another network, to hand off UE 107 from another network to the EPC, manage mobility of UE 107 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 107. In some embodiments, the establishment of communications sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625). In some embodiments, PCF 209 may be, may include, may be implemented by, and/or may be communicatively coupled to PCF/PCRF 625.

AF 630 may include one or more devices, systems, VNFs, CNFs, etc., that receive, store, and/or provide information that may be used in determining parameters (e.g., quality of service parameters, charging parameters, or the like) for certain applications.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 107, from DN 650, and may forward the user plane data toward UE 107 (e.g., via RAN 610, SMF/PGW-C 620, and/or one or more other devices). In some embodiments, multiple UPFs 635 may be deployed (e.g., in different geographical locations), and the delivery of content to UE 107 may be coordinated via the N9 interface (e.g., as denoted in FIG. 6 by the line marked "N9" originating and terminating at UPF/PGW-U 635). Similarly, UPF/PGW-U 635 may receive traffic from ULE 107 (e.g., via RAN 610, RAN 612, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635. In some embodiments, UPF 211 may be, may include, may be implemented by, and/or may be communicatively coupled to UPF/PGW-U 635.

UDM/HSS 640 and AUSF 645 may include one or more devices, systems, VNFs, CNFs, etc., that manage, update, and/or store, in one or more memory devices associated with AUSF 645 and/or UDM/HSS 640, profile information associated with a subscriber. AUSF 645 and/or UDM/HSS 640 may perform authentication, authorization, and/or accounting operations associated with the subscriber and/or a communication session with UE 107.

DN 650 may include one or more wired and/or wireless networks. For example, DN 650 may include an IP-based PDN, a wide area network ("WAN") such as the Internet, a private enterprise network, and/or one or more other networks. UE 107 may communicate, through DN 650, with data servers, other UEs 107, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 107 may communicate.

Figure 7:
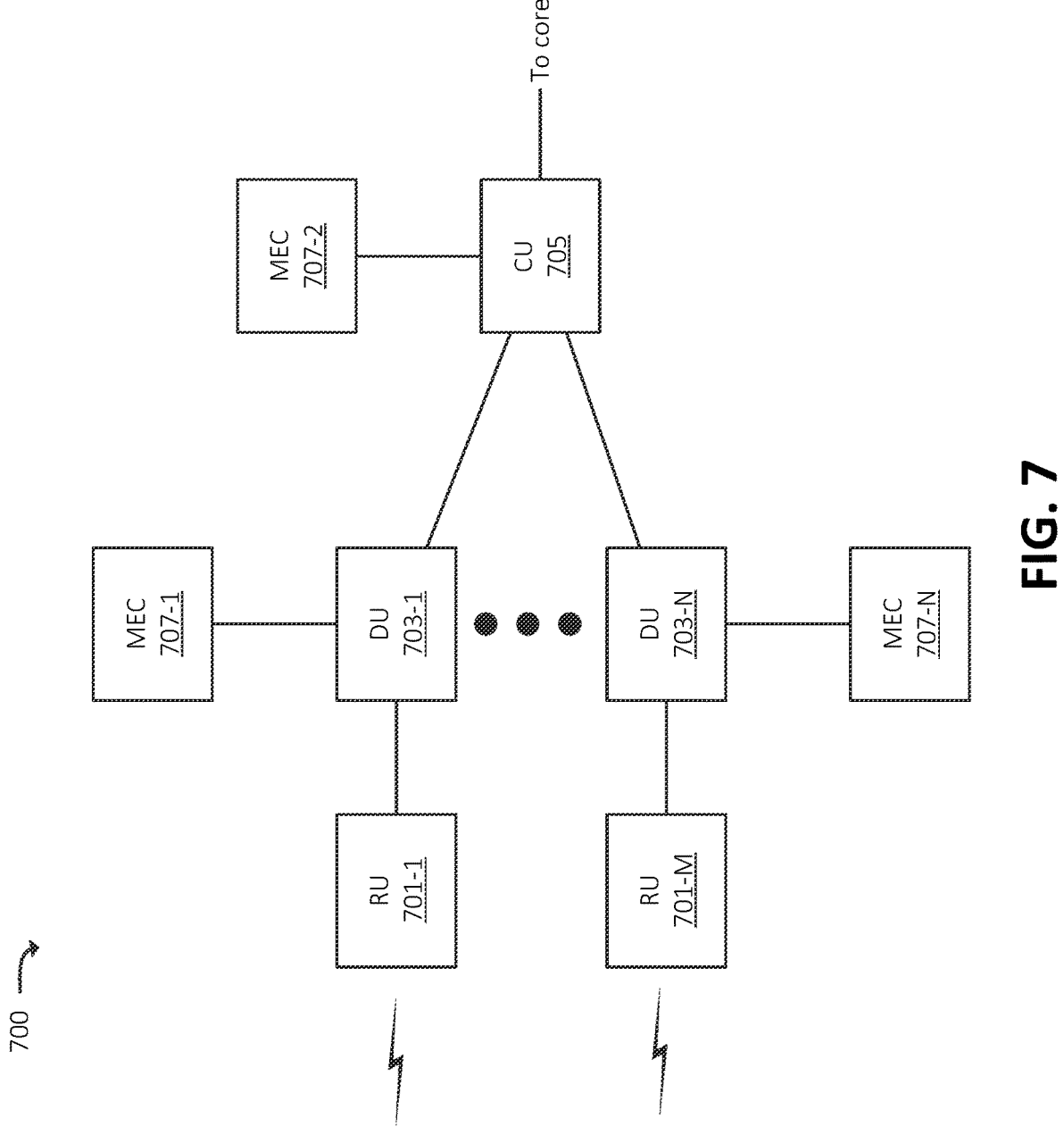
FIG. 7 illustrates an example arrangement of a RAN, in accordance with some embodiments.

FIG. 7 illustrates an example RAN environment 700, which may be included in and/or implemented by one or more RANs (e.g., RAN 610, RAN 612, or some other RAN). In some embodiments, a particular RAN may include one RAN environment 700. In some embodiments, a particular RAN may include multiple RAN environments 700. In some embodiments, RAN environment 700 may correspond to a particular gNB 611 of a 5G RAN (e.g., RAN 610). In some embodiments, RAN environment 700 may correspond to multiple gNBs 611. In some embodiments, RAN environment 700 may correspond to one or more other types of base stations of one or more other types of RANs. As shown, RAN environment 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 107 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 107, and may determine which DU(s) 703 should receive the downlink traffic. DU 703 may include one or more devices that transmit traffic between a core network (e.g., via CU 705) and UE 107 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 107.

RU 701 may include hardware circuitry (e.g., one or more RF transceivers, antennas, radios, and/or other suitable hardware) to communicate wirelessly (e.g., via an RF interface) with one or more UEs 107, one or more other DUs 703 (e.g., via RUs 701 associated with DUs 703), and/or any other suitable type of device. In the uplink direction, RU 701 may receive traffic from UE 107 and/or another DU 703 via the RF interface and may provide the traffic to DU 703. In the downlink direction, RU 701 may receive traffic from DU 703, and may provide the traffic to UE 107 and/or another DU 703.

One or more elements of RAN environment 700 may, in some embodiments, be communicatively coupled to one or more Multi-Access/Mobile Edge Computing ("MEC") devices, referred to sometimes herein simply as "MECs" 707. For example, DU 703-1 may be communicatively coupled to MEC 707-1, DU 703-N may be communicatively coupled to MEC 707-N, CU 705 may be communicatively coupled to MEC 707-2, and so on. MECs 707 may include hardware resources (e.g., configurable or provisionable hardware resources) that may be configured to provide services and/or otherwise process traffic to and/or from UE 107, via a respective RU 701.

For example, DU 703-1 may route some traffic, from UE 107, to MEC 707-1 instead of to a core network via CU 705. MEC 707-1 may process the traffic, perform one or more computations based on the received traffic, and may provide traffic to UE 107 via RU 701-1. In some embodiments, MEC 707 may include, and/or may implement, some or all of the functionality described above with respect to AF 630, UPF 635, and/or one or more other devices, systems, VNFs, CNFs, etc. In this manner, ultra-low latency services may be provided to UE 107, as traffic does not need to traverse DU 703, CU 705, links between DU 703 and CU 705, and an intervening backhaul network between RAN environment 700 and the core network.

Figure 8:
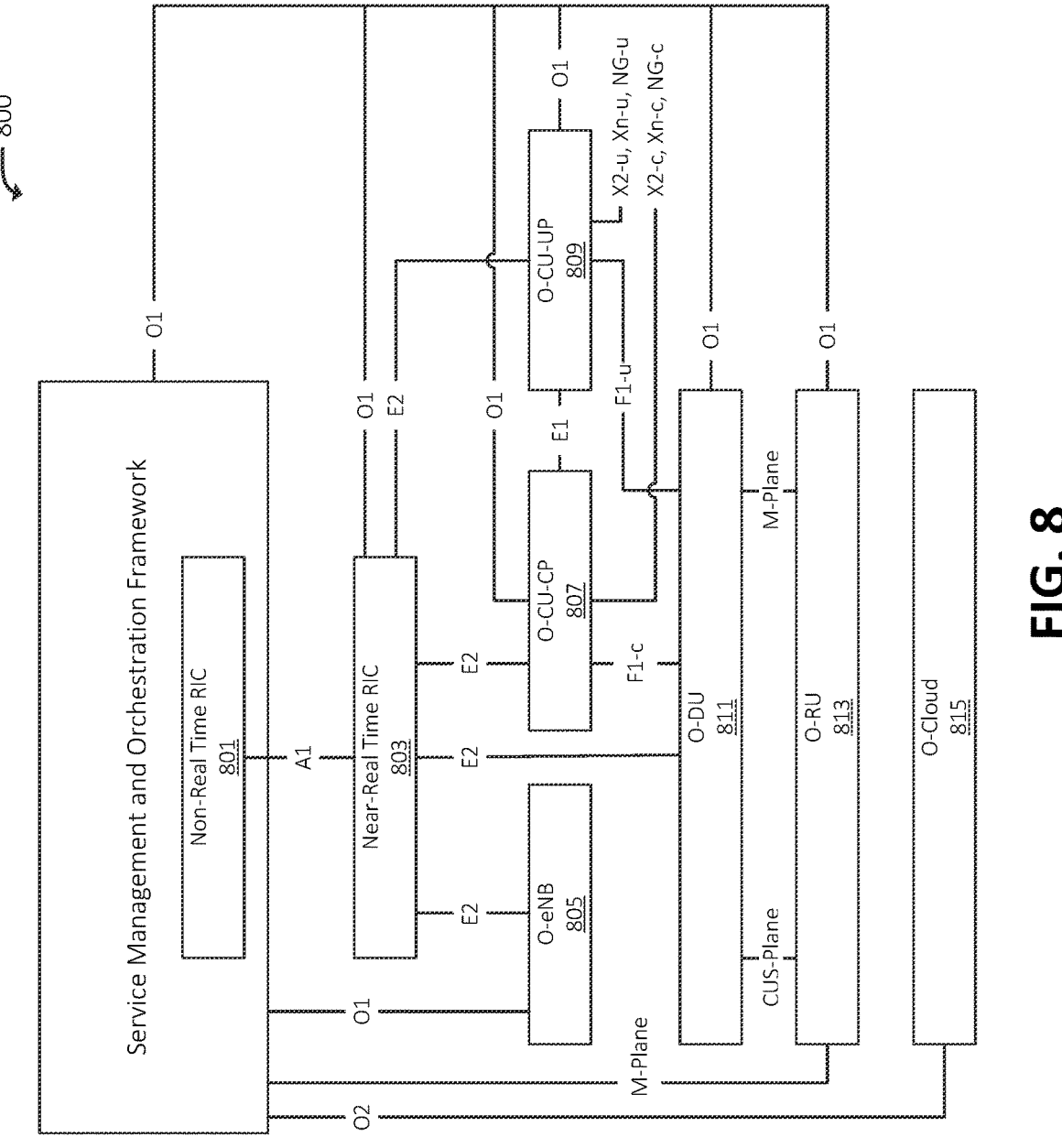
FIG. 8 illustrates an example arrangement of an Open RAN ("O-RAN") environment in which one or more embodiments, described herein, may be implemented.

FIG. 8 illustrates an example O-RAN environment 800, which may correspond to RAN 610, RAN 612, and/or DU network 700. For example, RAN 610, RAN 612, and/or DU network 700 may include one or more instances of O-RAN environment 800, and/or one or more instances of O-RAN environment 800 may implement RAN 610, RAN 612, DU network 700, and/or some portion thereof. As shown, O-RAN environment 800 may include Non-Real Time Radio Intelligent Controller ("RIC") 801, Near-Real Time RIC 803, O-eNB 805, O-CU-Control Plane ("O-CU-CP") 807, O-CU-User Plane ("O-CU-UP") 809, O-DU 811, O-RU 813, and O-Cloud 815. In some embodiments, O-RAN environment 800 may include additional, fewer, different, and/or differently arranged components.

In some embodiments, some or all of the elements of O-RAN environment 800 may be implemented by one or more configurable or provisionable resources, such as virtual machines, cloud computing systems, physical servers, and/or other types of configurable or provisionable resources. In some embodiments, some or all of O-RAN environment 800 may be implemented by, and/or communicatively coupled to, one or more MECs 627.

Non-Real Time RIC 801 and Near-Real Time RIC 803 may receive performance information (and/or other types of information) from one or more sources, and may configure other elements of O-RAN environment 800 based on such performance or other information. For example, Near-Real Time RIC 803 may receive performance information, via one or more E2 interfaces, from O-eNB 805, O-CU-CP 807, and/or O-CU-UP 809, and may modify parameters associated with O-eNB 805, O-CU-CP 807, and/or O-CU-UP 809 based on such performance information. Similarly, Non-Real Time RIC 801 may receive performance information associated with O-eNB 805, O-CU-CP 807, O-CU-UP 809, and/or one or more other elements of O-RAN environment 800 and may utilize machine learning and/or other higher level computing or processing to determine modifications to the configuration of O-eNB 805, O-CU-CP 807, O-CU-UP 809, and/or other elements of O-RAN environment 800. In some embodiments, Non-Real Time RIC 801 may generate machine learning models based on performance information associated with O-RAN environment 800 or other sources, and may provide such models to Near-Real Time RIC 803 for implementation. In some embodiments, Non-Real Time RIC 801 and Near-Real Time RIC 803 may implement, may be implemented by, and/or may be communicatively coupled to RAN controller 405.

O-eNB 805 may perform functions similar to those described above with respect to eNB 613. For example, O-eNB 805 may facilitate wireless communications between UE 1uu and a core network. O-CU-CP 807 may perform control plane signaling to coordinate the aggregation and/or distribution of traffic via one or more DUs 703, which may include and/or be implemented by one or more O-DUs 811, and O-CU-UP 809 may perform the aggregation and/or distribution of traffic via such DUs 703 (e.g., O-DUs 811). O-DU 811 may be communicatively coupled to one or more RUs 701, which may include and/or may be implemented by one or more O-RUs 813. In some embodiments, O-Cloud 815 may include or be implemented by one or more MECs 627, which may provide services, and may be communicatively coupled, to O-CU-CP 807, O-CU-UP 809, O-DU 811, and/or O-RU 813 (e.g., via an O1 and/or O2 interface).

Figure 9:
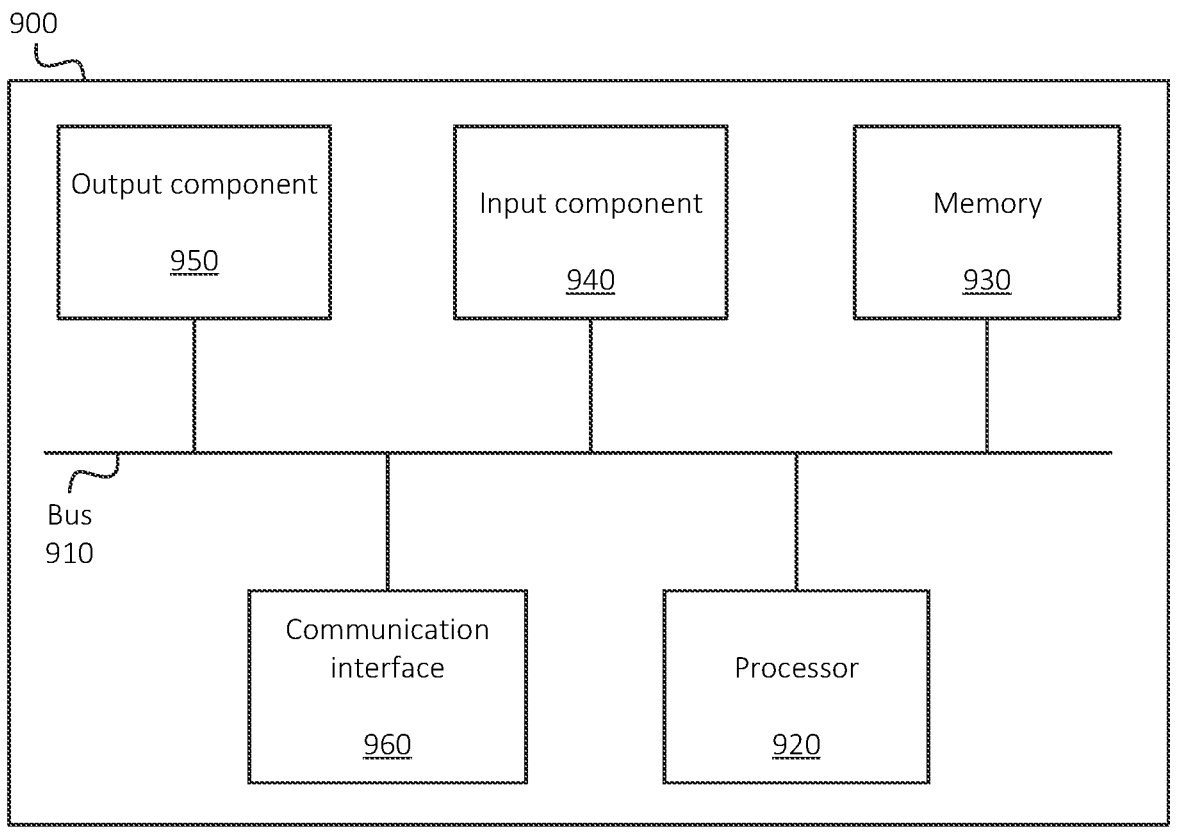
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a memory device storing a plurality of processor-executable instructions, and
one or more processors configured to execute the plurality of processor-executable instructions, wherein executing the plurality of processor-executable instructions causes the device to:
receive monitoring information associated with a plurality of User Equipment ("UEs") that receive service via a wireless network that includes a radio access network ("RAN") and a core network;
identify, based on the received monitoring information, a particular set of network configuration parameters to implement with respect to service provided to a particular UE, of the plurality of UEs, via at least one of the RAN or the core network of the wireless network; and
cause the wireless network to implement the identified set of network configuration parameters, wherein causing the wireless network to implement the identified set of network configuration parameters includes providing, to the wireless network via an exposure element associated with the wireless network, the identified set of network configuration parameters and an identifier of the particular UE,
wherein one or more elements of the RAN or one or more elements of the core network implement the provided set of network configuration parameters, wherein implementing the provided set of network configuration parameters includes modifying, based on the identifier of the particular UE, parameters of the service provided to the particular UE via the wireless network.

2. The device of claim 1, wherein implementing the provided set of network configuration parameters includes modifying parameters of the service provided to the particular UE without modifying parameters of service provided to one or more other UEs of the plurality of UEs.

3. The device of claim 1, wherein the exposure element includes at least one of:
a Network Exposure Function ("NEF"), or
a Service Capability Exposure Function ("SCEF").

4. The device of claim 1, wherein the wireless network includes at least one particular element that communicates with the particular UE, wherein the at least one particular element identifies the network configuration parameters for the particular UE based on the identifier of the particular UE.

5. The device of claim 4, wherein the at least one particular element subscribes to information, provided to the wireless network, that is associated with the particular UE based on communicating with the particular UE.

6. The device of claim 1, wherein the particular set of network configuration parameters include at least one of:
one or more radio access technologies ("RATs") that the particular UE is authorized to access via the RAN of the wireless network,
one or more frequency bands that the particular UE is authorized to access via the RAN,
one or more RATs that the particular UE is not authorized to access via the RAN, or
one or more frequency bands that the particular UE is not authorized to access via the RAN.

7. A non-transitory computer-readable medium, storing a plurality of processor-executable instructions to:
receive monitoring information associated with a plurality of User Equipment ("UEs") that receive service via a wireless network that includes a radio access network ("RAN") and a core network;
identify, based on the received monitoring information, a particular set of network configuration parameters to implement with respect to service provided to a particular UE, of the plurality of UEs, via at least one of the RAN or the core network of the wireless network; and
cause the wireless network to implement the identified set of network configuration parameters, wherein causing the wireless network to implement the identified set of network configuration parameters includes providing, to the wireless network via an exposure element associated with the wireless network, the identified set of network configuration parameters and an identifier of the particular UE,
wherein one or more elements of the RAN or one or more elements of the core network implement the provided set of network configuration parameters, wherein implementing the provided set of network configuration parameters includes modifying, based on the identifier of the particular UE, parameters of the service provided to the particular UE via the wireless network.

8. The non-transitory computer-readable medium of claim 7, wherein implementing the provided set of network configuration parameters includes modifying parameters of the service provided to the particular UE without modifying parameters of service provided to one or more other UEs of the plurality of UEs.

9. The non-transitory computer-readable medium of claim 7, wherein the exposure element includes at least one of:
a Network Exposure Function ("NEF"), or
a Service Capability Exposure Function ("SCEF").

10. The non-transitory computer-readable medium of claim 7, wherein the wireless network includes at least one particular element that communicates with the particular UE, wherein the at least one particular element identifies the network configuration parameters for the particular UE based on the identifier of the particular UE.

11. The non-transitory computer-readable medium of claim 10, wherein the at least one particular element subscribes to information, provided to the wireless network, that is associated with the particular UE based on communicating with the particular UE.

12. The non-transitory computer-readable medium of claim 7, wherein the particular set of network configuration parameters include at least one of:
one or more radio access technologies ("RATs") that the particular UE is authorized to access via the RAN of the wireless network,
one or more frequency bands that the particular UE is authorized to access via the RAN,
one or more RATs that the particular UE is not authorized to access via the RAN, or
one or more frequency bands that the particular UE is not authorized to access via the RAN.

13. A method, comprising:
receiving monitoring information associated with a plurality of User Equipment ("UEs") that receive service via a wireless network that includes a radio access network "RAN") and a core network;

identifying, based on the received monitoring information, a particular set of network configuration parameters to implement with respect to service provided to a particular UE, of the plurality of UEs, via at least one of the RAN or the core network of the wireless network; and causing the wireless network to implement the identified set of network configuration parameters, wherein causing the wireless network to implement providing the identified set of network configuration parameters includes providing, to the wireless network via an exposure element associated with the wireless network, the identified set of network configuration parameters and an identifier of the particular UE, wherein one or more elements of the RAN or one or more elements of the core network implement the provided set of network configuration parameters, wherein implementing the provided set of network configuration parameters includes modifying, based on the identifier of the particular UE, parameters of the service provided to the particular UE via the wireless network.

14. The method of claim 13, wherein implementing the provided set of network configuration parameters includes modifying parameters of the service provided to the particular UE without modifying parameters of service provided to one or more other UEs of the plurality of UEs.

15. The method of claim 13, wherein the exposure element includes at least one of:

a Network Exposure Function ("NEF"), or a Service Capability Exposure Function ("SCEF").

16. The method of claim 13, wherein the wireless network includes at least one particular element that communicates with the particular UE, wherein the at least one particular element identifies the network configuration parameters for the particular UE based on the identifier of the particular UE.

17. The method of claim 16, wherein the at least one particular element subscribes to information, provided to the wireless network, that is associated with the particular UE based on communicating with the particular UE.

18. The method of claim 13, wherein the particular set of network configuration parameters include at least one of:

one or more radio access technologies ("RATs") that the particular UE is authorized to access via the RAN of the wireless network, one or more frequency bands that the particular UE is authorized to access via the RAN, one or more RATs that the particular UE is not authorized to access via the RAN, or one or more frequency bands that the particular UE is not authorized to access via the RAN.

19. The method of claim 13, wherein the one or more elements of the core network include one or more Network Functions ("NFs") of the core network, and wherein the one or more elements of the RAN include one or more base stations of the RAN.

20. The device of claim 1, wherein the one or more elements of the core network include one or more Network Functions ("NFs") of the core network, and wherein the one or more elements of the RAN include one or more base stations of the RAN.

21. The non-transitory computer-readable medium of claim 7, wherein the one or more elements of the core network include one or more Network Functions ("NFs") of the core network, and wherein the one or more elements of the RAN include one or more base stations of the RAN.

* * * * *